United States Patent
Watanabe et al.

[19]

[11] Patent Number: 5,824,156
[45] Date of Patent: Oct. 20, 1998

[54] INTERMITTENT COATING APPARATUS, INTERMITTENT COATING METHOD AND MANUFACTURING METHOD OF BATTERY ELECTRODES, AND NON AQUEOUS ELECROLYTE CELL

[75] Inventors: Masaru Watanabe, Hyogo; Yasuhiro Ueyama, Osaka; Toshikazu Nakamura, Osaka; Yorihito Ohana, Osaka; Tetsuya Hayashi, Osaka, all of Japan

[73] Assignee: Matsushita Electric Industrial Co., Ltd., Osaka, Japan

[21] Appl. No.: 579,267

[22] Filed: Dec. 27, 1995

[30] Foreign Application Priority Data

Dec. 27, 1994 [JP] Japan .................................. 6-325175

[51] Int. Cl.⁶ ................................................. B05C 5/00
[52] U.S. Cl. ........................ 118/410; 118/300; 118/302; 118/419
[58] Field of Search ................................... 118/300, 302, 118/410, 419

[56] References Cited

U.S. PATENT DOCUMENTS 841,587   10/1907  Shimar .
3,126,574  3/1964  Fox ........................................ 118/411
3,892,339  7/1975  Idler .
4,535,719  8/1985  Regan .................................... 118/410
4,744,330  5/1988  Chaassen ............................... 118/410

FOREIGN PATENT DOCUMENTS 2075005    8/1971  France .
62-266157 11/1987  Japan .
7068208    3/1994  Japan .
7-65816    3/1995  Japan .
7-94170    4/1995  Japan .

*Primary Examiner*—Laura Edwards
*Attorney, Agent, or Firm*—McDermott Will & Emery

[57] ABSTRACT

Roll 13 drives base material 12 run continuously, and nozzle 1 applies paint 11 supplied by head 2 on base material intermittently. Head 2 shuts the flow of paint 11 to nozzle 1, when application of paint 11 is suspended, and guides to a place other than nozzle 1, at the same time sucks paint 11 staying in the inside of nozzle 1 and at the exit of slit 7 to sucking part 25 provided in inside of nozzle 1; when application of paint 11 is resumed, releases the flow of paint 11 to nozzle 1, at the same time returns paint 11 that was sucked in sucking part 25 to the inside of nozzle 1; thereby the starting edge and the ending edge of coated areas intermittently applied on the base material can be made to assume a straight line shape, and occurrence of the thicker coating at the starting edge is also prevented.

14 Claims, 15 Drawing Sheets

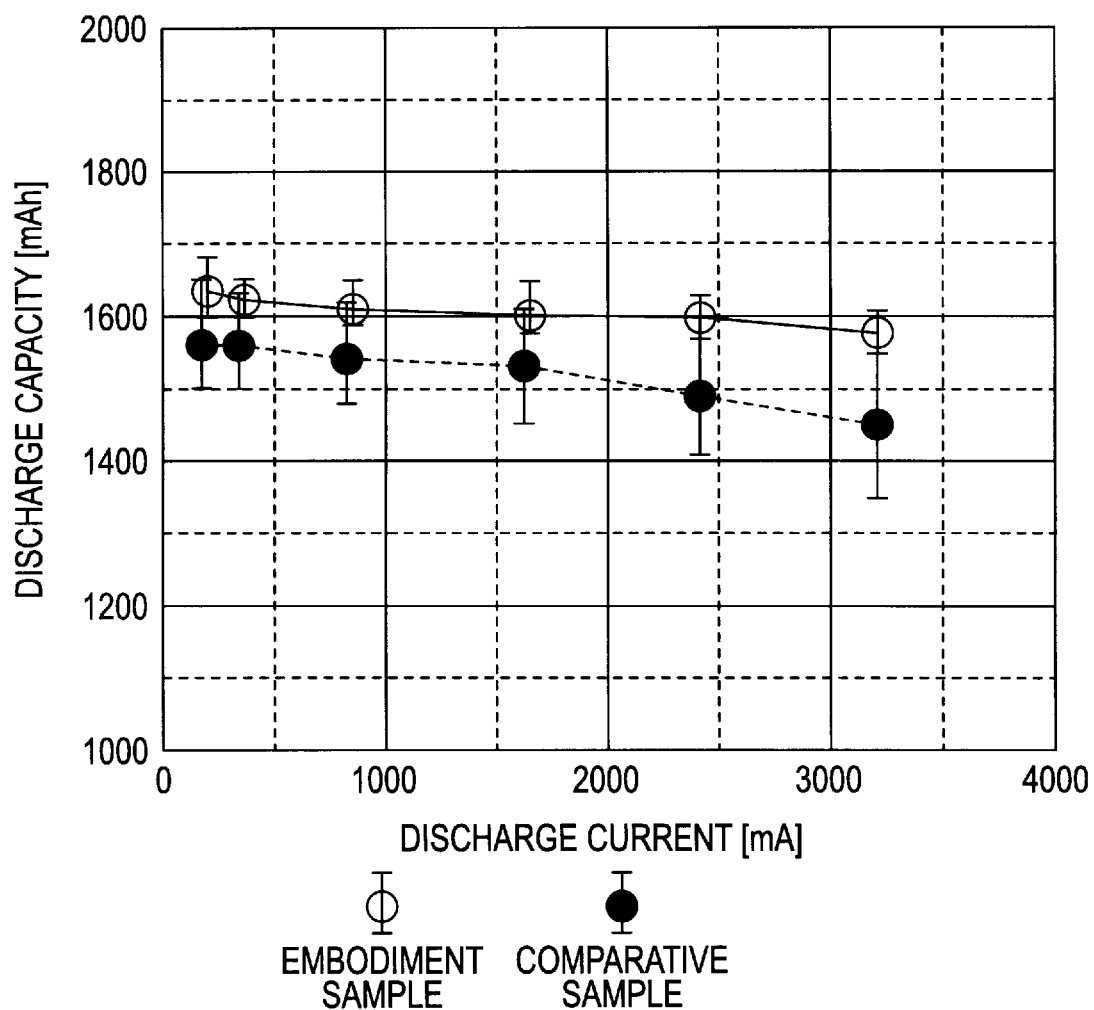

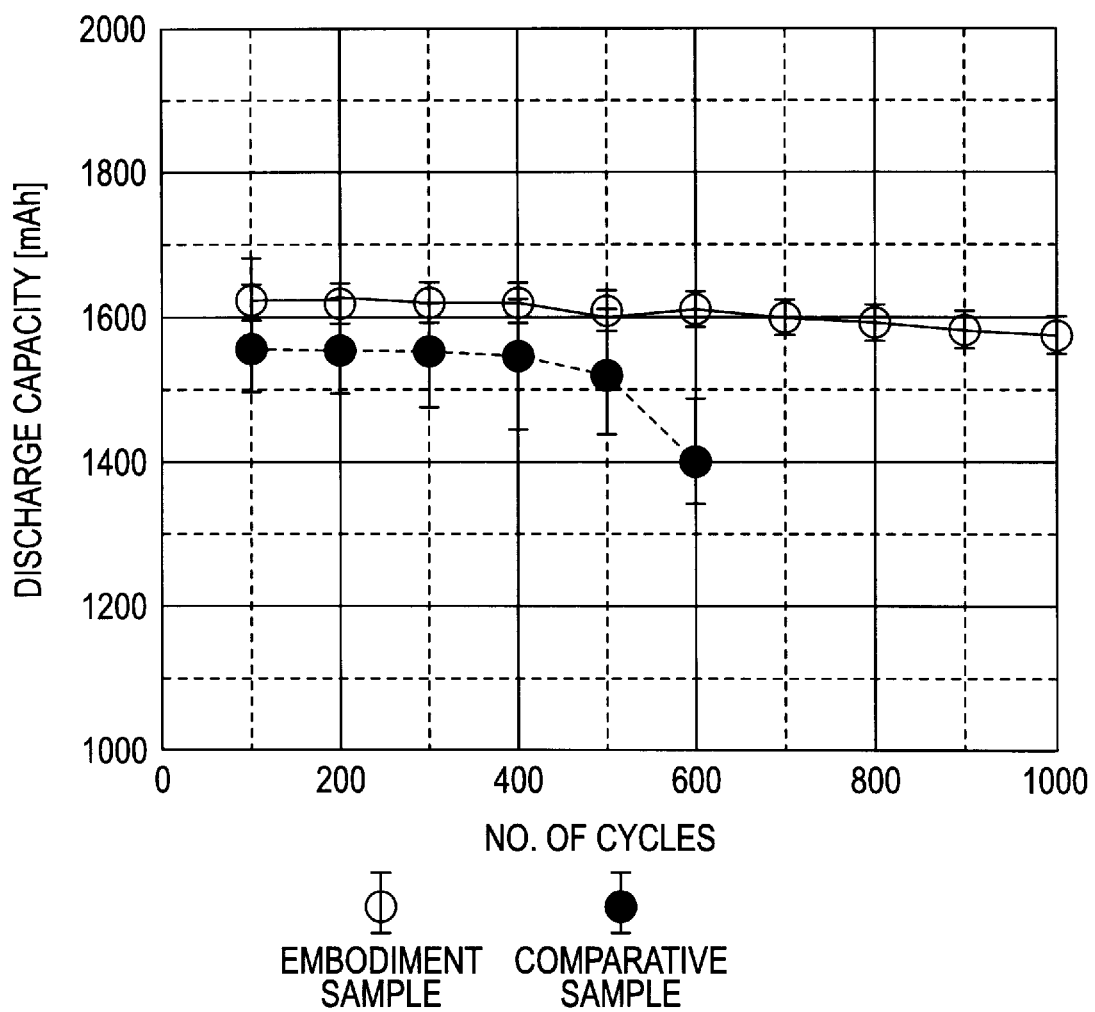

INTERMITTENT COATING APPARATUS, INTERMITTENT COATING METHOD AND MANUFACTURING METHOD OF BATTERY ELECTRODES, AND NON AQUEOUS ELECROLYTE CELL

FIELD OF THE INVENTION

The present invention relates to an intermittent coating apparatus for applying paint or active material paste intermittently on continuously running base material or electricity collector body, an intermittent coating method and manufacturing method of battery electrodes, and a non aqueous electrolyte cell comprising battery electrodes manufactured by the manufacturing method of battery electrodes.

BACKGROUND OF THE INVENTION

Among the patents relating to an apparatus for intermittently coating adhesive on a continuously running body, a Japanese patent publicized in Japanese Patent Laid-Open SHO62-266157, for example, is known. According to the patent, a hot melt is supplied to a nozzle to be applied on a continuously running base material, and the supply of hot melt to the nozzle is suspended when no coating is to be made. By repeating this operation, an intermittent coating is conducted on a base material.

In the mean time, along with the recent trends towards the smaller and lighter bodies in various electronic equipments such as VCR, telecommunication equipment, etc., it is an increasing demand to develop batteries, as the power source to these equipments, that have high energy density.

The non aqueous eletrolyte cell is a one to meet such demands. Research and development activities are remakable especially in the lithium secondary battery in which lithium containing composite oxide such as lithium cobalt oxide is used for the positive electrode, and a carbon material for the negative electrode.

However, this type of batteries show poor discharge rate characteristic because of the low electric conductivity of the non aqueous electrolyte used. Therefore, the electrode layer formed on an electroconductive collector body needs to be made thinner in order to increase the electricity collecting capability. In addition, in this type of batteries, the positive/negative electrodes are shaped in a sheet form to increase the space of reaction, separator is placed in between the electrode sheets with the gap minimized, the electrode sheets are wound to a spiral structure to increase the volume of active material to be filled in, in order to secure the discharge capacity of battery. When, the electricity collecting capability is greatly influenced by the shape of the electrode surface. The discharge characteristics depend very much on whether or not homogeneous collecting capability is provided over the entire electrode.

In conventional electrode manufacturing methods, the use of a doctor blade is proposed as specified in patents, for example, Japanese Patent Laid-Open HEI1-184069, Japanese Patent Laid-Open HEI1-194265 and Japanese Patent Laid-Open HEI4-242071. According to these methods, a doctor blade is provided with a certain gap to collector body, and a sheet formed electrode is shaped when paint of active material stored in the front of doctor blade is pulled out in layer form between the doctor blade and the running collector body.

In the method where the active material paint is stored in the front of doctor blade while coating is conducted, however, it was difficult to make a stable coating because solvent evaporates during coating causing the shift of paint density.

Also studied include such coating method using an extrusion type liquid dispenser, as publicized in Japanese Patent Laid-Open HEI7-65816 and Japanese Patent Laid-Open HEI7-94170. According to the former patent, the paint is stabilized through control of the volume of coating; thereby spread in the discharge capacity at manufacture is made smaller, implementing the smaller spread of the rate characteristic.

However, in a prior art intermittent coating apparatus, when applying paint more than 50 $cc/m^2$ on a base material the starting edge 24 and the ending edge 22 of coating do not sometimes take a shape of a straight line because some of the paint ropes in the direction of slit width on the base material, as shown in FIG. 15. This phenomenon seems to have been caused because the volume of application is much and paints kept between the nozzle and the base material and those stayed in the neighbourhood of slit exit of the nozzle are pulled together by the base material. Moreover, because there is no place for the paint to return when coating is stopped the pressure in the supply piping goes up, creating a factor for making the starting edge of coating thicker.

In prior art methods of manufacturing battery electrodes, active material paints are coated continuously on a collector body. Therefore, another process of peeling-off becomes necessary to form a lead part on the collector body. For example, a patent as specified in Japanese Patent Laid-Open HEI2-98040 proposes a method of forming a lead part by placing a knife-like tool at a location where the active material is to be peeled-off, from both surfaces of the active material, after the active material paint is applied and dried.

Placing an additional process for peeling-off the active material layer is not only a redundant installation, but it also gives a mechanical stress on remaining active material layer, which results in a deterioration in the adhesion of the remaining active material layer at its borders to the collector body. Also, fine dusts of the peeled active material layer stick on the electrode sheet. In the event a battery is made with such electrode sheet, the active material layer falls off to cause internal short circuit; unable to get power generation or the discharge capacity diminishes after some charge/discharge cycles.

In Japanese Patent Laid-Open HEI7-94170, it is proposed to form the lead parts simultaneously by using an extrusion type liquid dispenser having a slot for supplying the active material paint, providing at least one strip of uncoated area on the collector body stretching in the running direction. According to this method, the uncoated area for the lead part can be formed while paint is being applied, and a process to peel-off the active material layer after it is applied and dried turns out to be unnecessary.

In this method, however, because the uncoated area stretches along the running direction, the sheet has to be slitted to specified size in the direction of width when making a spiraled sheet electrode. Such pattern is not necessarily a good pattern of high efficiency considering that the sheet is manufactured on a machine continuously.

SUMMARY OF THE INVENTION

A first objective of the present invention is to offer an intermittent coating apparatus and method, wherein the starting edge and the ending edge of coated areas formed intermittently on a base material are shaped in a form of a straight line, and the thicker application of paint at the starting edge is prevented.

A second objective is to decrease the number of process steps for improved productivity by intermittently providing uncoated areas in the width direction of collector body, at the same time to improve the adhesion between the collector and the edge of active material layer; thereby a battery having improved discharge capacity, rate characteristic, cycle characteristic and other battery characteristics is implemented.

In an intermittent coating apparatus according to the present invention, in order to attain the first objective, paint supplied from an intermittent device is applied through a nozzle on a continuously running base material, wherein the intermittent device is constituted in a way that when to suspend coating the flow of said paint to said nozzle is blocked and led to a means other than said nozzle, and at the same time said paint staying within said nozzle and at the exit of slit is sucked to a place provided within said nozzle; when to resume the coating the flow of said paint to said nozzle is opened, and at the same time said paint that was sucked to said place is returned to inside of said nozzle.

By so doing, when to suspend application, the paint supply to nozzle is stopped, and at the same time the paint between the nozzle and the base material and that staying at the exit of nozzle slit are forcedly sucked to inside of the nozzle; therefore even though the volume of application is much, the starting and ending edges of the coating are made to form a straight line shape. Moreover, because the paint is guided to the return channel to be fed to a place other than the nozzle the pressure in the paint supply means never goes up, therefore the pressure at restarting of the application is maintained at normal level, and the thicker application at the restart of coating is prevented.

An intermittent coating method according to the present invention comprises a process to apply paint, which is supplied to the nozzle from an intermittent device for supplying paint intermittentlly, on a continuously running base material and a process to stop the application; wherein the process to stop the application suspends flow of said paint to said nozzle, feeds the flow to a place other than the nozzle, at the same time said paint staying in said nozzle and at slit exit is sucked to a specified place provided within said nozzle; whereas the process to apply paint releases flow of said paint to said nozzle and returns said paint that was sucked in said specific place to inside of said nozzle, wherein the volume of said paint to be pulled by said sucking is regulated to be not less than 0.1 mm$^3$ and not more than 500 mm$^3$ per 10 mm slit width; thereby said paint is applied intermittently on said base material.

By controlling the volume of paint to be forcedly sucked to inside of the nozzle at the stop of application to be not less than 0.1 mm$^3$ per 10 mm slit width, paints staying between the nozzle and the base material and at the slit exit of the nozzle when stopped can surely be sucked to inside of the nozzle. Further, by controlling said volume to be not more than 500 mm$^3$, when returning the paint that was sucked in a specified place inside the nozzle to the nozzle in resuming the application, embracing of the air into the paint while the paint is being pushed out in the slit to exit can be avoided. As a result, the starting and ending edges of the coated area are made to have a straight line shape even when the volume of application is much.

In order to implement the second objective, a manufacturing method of battery electrodes according to the present invention comprises a coating process for applying active material paste which is supplied to the nozzle from an intermittent device on continuously running collector body and a process to suspend the application; wherein the process to suspend the application stops flow of said active material paste to said nozzle and guides to a place other than said nozzle, and said active material paste staying in said nozzle and at the slit exit are sucked to a specified place provided inside of said nozzle; whereas the coating process releases the flow of said active material paste to said nozzle, at the same time returns said active material paste which was sucked in said specific place to inside of said nozzle; thus said active material paste is applied intermittently on said collector body.

By so doing, the uncoated area is formed on the collector body in the direction of width, as a result the number of manufacturing process steps is reduced and the productivity is increased, the adhesion of active material layer at the boundary area to collector body is increased, thus a battery having improved discharge capacity, rate characteristic, cycle characteristic and other battery characteristics is implemented.

A non aqueous electrolyte battery according to the present invention is a battery manufactured using battery electrodes manufactured in accordance with the above described manufacturing method of battery electrodes.

Through what have been described in the foregoing, a new battery is implemented with which the discharge capacity, rate characteristic, cycle characteristic and other battery characteristics are improved.

BRIEF DESCRIPTION OF THE DRAWINGS

FIG. 17 shows discharge voltage characteristics of batteries using electrodes manufactured by a manufacturing method fo battery electrodes according to a tenth embodiment of the present invention.

FIG. 18 is characteristics chart showing the variation in discharge capacity during cycle life measurement of batteries using electrodes manufactured by the above manufacturing method of battery electrodes.

DESCRIPTION OF THE PREFERRED EMBODIMENTS

Figure 1:
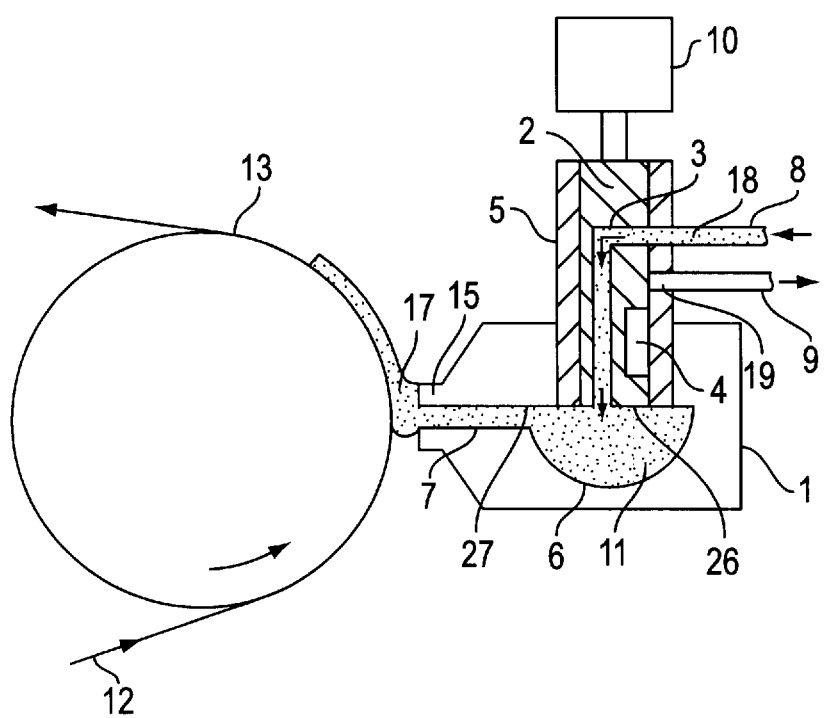
FIG. 1 is cross sectional side view showing an intermittent coating apparatus in application action, according to a first embodiment of the present invention.

A first embodiment of the present invention is described in the following referring to FIG. 1 and FIG. 2.

The first embodiment relates to an intermittent coating apparatus; FIG. 1 shows the apparatus applying paint 11 on base material 12, FIG. 2 shows a state when the application is suspended.

As illustrated in the FIGs, nozzle 1 applies paint 11 supplied from head 2 constituting an intermittent device on base material 12 which is continuously running held by roll 13. Head 2 is provided with supply channel 3 for guiding the flow of paint 11 to the inside of nozzle 1, and return channel 4 for guiding the flow of paint 11 to a place other than nozzle 1; the head is positioned with free movement in the inside of housing 5 which is fixed to nozzle 1, so that the head is movable up and down driven by head driving device 10. The paint 11 includes painting liquid, paste, ink and slurry.

Nozzle 1 is provided with manifold 6 connected with supply channel 3 of head 2, and slit 7 connected with the manifold 6. Supply pipe 8 is connected to intake 18 of housing 5 and supplies paint 11, while return pipe 9 is connected to exit 19 of housing 5 and returns paint 11. In order to prevent head 2 from revolving, the cross section of which may have either a square or a polygon shape, or round if equipped with an anti-revolving pin(not shown).

With the above mentioned constitution, the operation is described in the following. While in application operation, a pump(not shown) makes paint 11 going through supply pipe 8 to intake 18 of housing 5, supply channel 3 of head 2, manifold 6 of nozzle 1, and pushed out of slit 7 to be applied on base material 12 which is continuously running held by roll 13.

Figure 2:
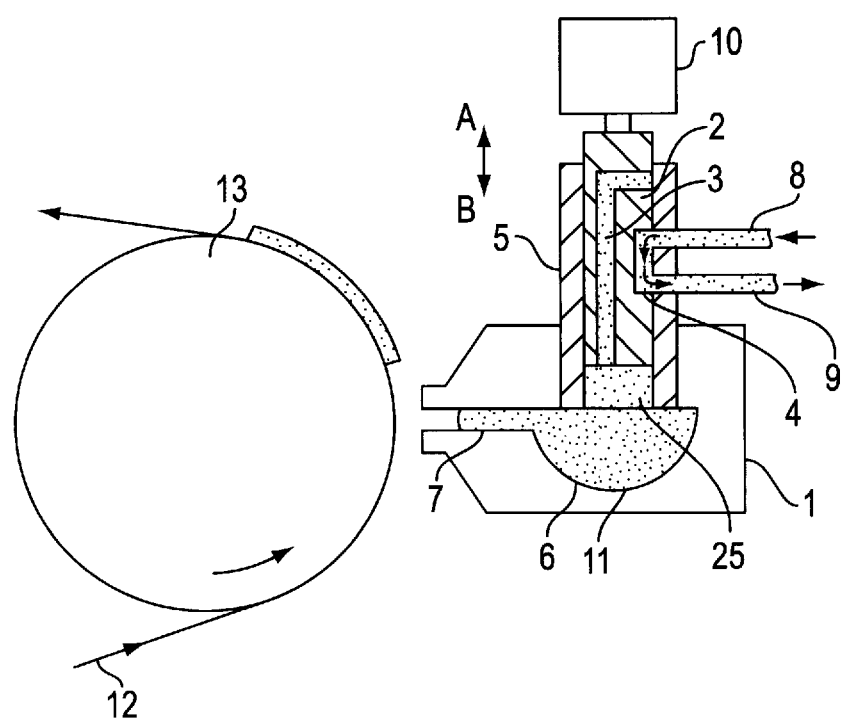
FIG. 2 is cross sectional side view showing the above intermittent coating apparatus while coating action is suspended.

While the application work is suspended, a head driving device 10 moves head 2 in the direction A as indicated in FIG. 2, therefore sucking part (suction chamber) 25 is formed and paint 11 staying between the end of nozzle 1 and base material 12 and at the exit of slit 7 is sucked to inside of nozzle 1. This makes the shape of ending edge of coated area straight, when paint application action is stopped.

When, the entrance of supply channel 3 is closed with the sliding surface of housing 5, and paint 11 goes from supply pipe 8 to return pipe 9 through intake 18 of housing 5 via return channel 4 of head 2. In this way, the increase of paint pressure in supply pipe 8 at the suspension of application work is suppressed. Therefore, at resuming of the application, when head 2 is moved in the direction B to start supplying paint to nozzle 1, the pressure of paint in nozzle 1 never goes up. This prevents the occurrence of the thicker coating at the starting edge.

What is most significant with this embodiment is that by simply moving head 2 in the direction A three functions, viz., shut, return and suck, are performed at the same time; namely, the supply of paint 11 to nozzle 1 is shut and made to return, and paint 11 staying between the end of nozzle 1 and base material 12 and at the exit of slit 7 is sucked in to the inside of nozzle 1.

In this embodiment, sucking part(a specified place) 25 is formed by shifting the position of head 2 which constitutes an intermittent device and the volume of paint 11 to be sucked equals to the space of sucking part formed by the position shifting of head 2. This means that a sucking part 25 for sucking paint 11 is formed without fail by the shift of head 2, and the volume of sucking part 25 is mechanically decided, therefore the reproducibility of intermittent application is secured.

During application work, the side surface in nozzle side of head 2 and the surface of slit 27 should preferably form a single flat plane. In such constitution, where there is no unnecessary unevenness, the paint does not find any place to stay on the slit surface 27; which prevents the occurrence of striped painting caused by clot of paint.

The diameter of roll 13 for holding base material 12 has to be not less than 50 mm. Normally, the diameter falls within a range from 150 mm to 400 mm. If it is smaller than 50 mm the difference between the largest clearance and the smallest clearance of the gap between the downstream lip 15 and base material 12 goes too much, which eventually increases the volume of paint staying at part 17. As a result, paint 11 staying at part 17 is not thoroughly sucked up to nozzle 1, leaving a disturbance at the ending edge of coated area.

Although in FIG. 1 the end of nozzle 1 has flat surface, it is not necessarily to be flat in this embodiment. It may either be, for example, a curved shape having a certain radius, a polygon or a sharp edged shape.

The gap between the end of nozzle 1 and base material 12 held by roll 13 is preferably to be not more than 2 mm. If it is more than 2 mm the volume of paint existing in the gap between the end of nozzle 1 and the base material 12 turns out to be too much to be completely sucked to inside of nozzle 1; this causes a difficulty in making the ending edge straight.

In this embodiment, a paint of viscosity poise 5 containing carbon powder having average grain diameter 5 $\mu$m is applied intermittently on a film of 20 $\mu$m thick as the base material 12. A cycle of 100 mm coating followed by 10 mm uncoat in the running direction of base material 12 is repeated. Speed of the film is 20 m/min, volume of application 80 cc/m$^2$.

Figure 15:
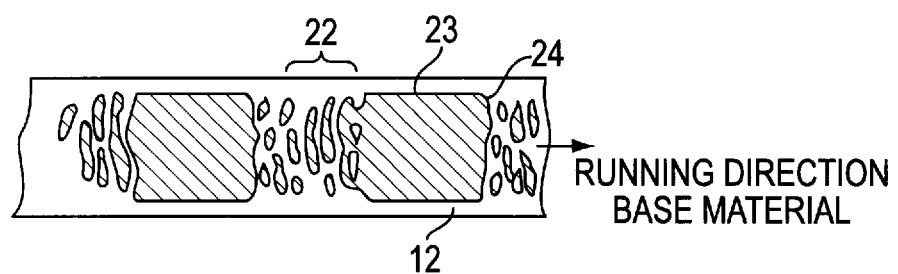
FIG. 15 shows intermittently coated layers applied by a prior art intermittent coating apparatus.
Figure 16:
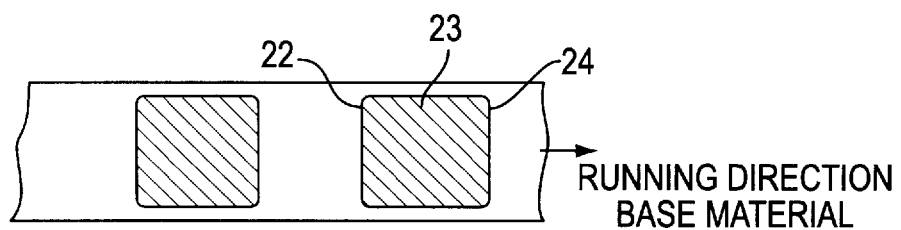
FIG. 16 shows intermittently coated layers applied by an intermittent coating apparatus according to the present invention.

By doing in accordance with this embodiment, the ending edge 22 and the starting edge 24 of area 23 coated with paint 11 on base material 12 were made to have a straight line shape, furthermore it implemented an intermittent coating having homogeneous thickness on the film in the running direction, without causing the thicker application at the starting edge 24, as shown in FIG. 16. On the other hand, in a prior art intermittent coating conducted with the same setup the ending edge 22 and the starting edge 24 of coated area 23 showed trouble, and the starting edge 24 was thicker, as shown in FIG. 15. The above results reveal the effectiveness of this embodiment.

Figure 3:
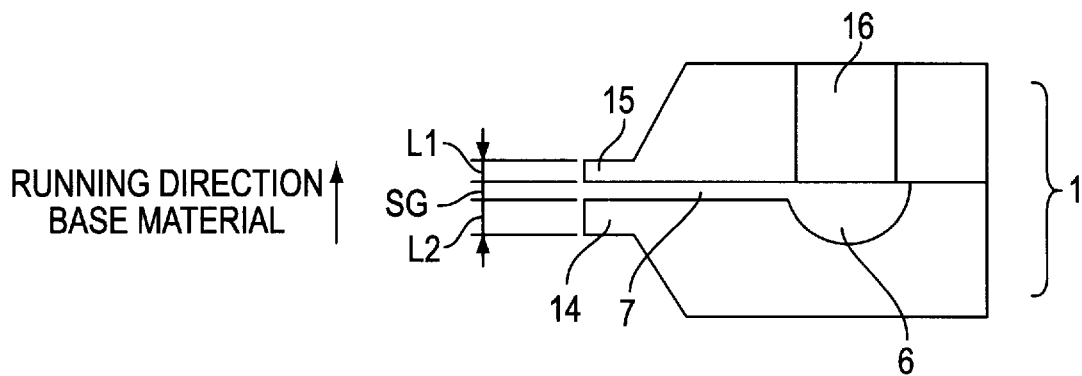
FIG. 3 is cross sectional side view showing nozzle of an intermittent coating apparatus according to a second embodiment of the present invention.

Next, a second embodiment is described referring to FIG. 3.

The second embodiment relates to an intermittent coating apparatus, a most remakable feature is in the lip-end shape of nozzle 1. Where, the surface length of lip 14 located in the upstream of slit 7 in the running direction of base material 12 is designated as L2, and that of downstream lip 15 as L1; it is constituted to be 0.1 mm≦L1≦3 mm. More preferrably, 0.1 mm≦L1≦2 mm. As to L2, although there is no specific restriction it is ususlly more than 0.2 mm and less than 5 mm. The hole 16 is to attach housing 5 as shown in FIG. 1. Other constituents remain the same as in the embodiment 1.

The operation is described with the above mentioned constitution. In the same way as in the embodiment 1 shown in FIG. 1 and FIG. 2, in an apparatus of embodiment 2, a pump (not shown) makes paint 11 going through supply pipe 8 to intake 18 of housing 5, to supply channel 3 of head 2, manifold 6 of nozzle 1, and the paint is pushed out of slit 7 to be applied on base material 12 which is running continuously held by roll 13, while in application operation. While the application work is suspended, sucking part 25 is fromed by the shifting of head 2 in the direction A, and paint 11 staying between the end of nozzle 1 and base material 12 and at the exit of slit 7 is sucked to inside of nozzle 1. This makes the shape of ending edge of coated area straight, when paint application work is suspended.

When, the entrance of supply channel 3 is closed with the sliding surface of housing 5, and paint 11 goes from supply pipe 8 to return pipe 9 through intake 18 of housing 5 via return channel 4 of head 2. In this way, the increase of paint pressure in supply pipe 8 at the suspension of application work is suppressed. Therefore, at resuming of the application, when head 2 is moved in the direction B to start supplying paint to nozzle 1, the pressure of paint in nozzle 1 never goes up. This prevents the occurrence of the thicker coating at the starting edge.

In this embodiment, the surface length L1 of the downstream lip 15 is specified to be 0.1 mm≦L1≦3 mm, more preferably to be 0.1≦L1≦2 mm. Therefore, the volume of paint 11 retained in the part 17 is small, or the volume of paint 11 to be sucked by the shifting of head 2 is small, and the paint 11 existing between nozzle 1 and base material 12 is thoroughly sucked to inside of nozzle 1. As a result, even when the volume of application is much the starting edge and the ending edge of coated area are kept in a shape of a straight line.

If the surface length L1 of downstream lip is smaller than 0.1 mm, the volume of paint in the part 17 surely decreases; however too short a length does not provide sufficient pressure between downstream lip 15 and base material 12, and the homogeniety in the width direction of the layer thickness is affected. If it is longer than 3 mm, the volume of paint at the part 17 goes too much to maintain the ending edge of coating area straight.

When paint 11 has a high viscosity, higher than poise 1, it turns out to be difficult to suck paint in the part 17 into nozzle 1. Therefore, L1 is preferably to be less than 2 mm.

The slit gap SG of slit 7 should be not less than 0.1 mm and not more than 2 mm. If the slit gap SG is smaller than 0.1 mm sucking of paint goes difficult because of the increased resistance of paint 11 flowing in slit 7. If the slit gap SG is larger than 2 mm volume of paint at the exit of slit 7 increases too much to maintain the straight ending edge of the coating area.

The diameter of roll 13 for holding base material 12 should be not smaller than 50 mm. Normally, it is from 150 mm to 400 mm. If it is smaller than 50 mm the difference between the largest clearance and the smallest clearance of the gap between the downstream lip 15 and base material 12 goes too much, which eventually increases the volume of paint staying at the part 17. As a result, paint 11 staying at the part 17 is not thoroughly sucked up to nozzle 1, leaving a disturbance at the ending edge of the coated area. The sucking volume of paint 11 is equal to the space 25 formed by the shift of head 2.

In order to prevent head 2 from revolving, the cross section of which may have either a square or a polygon shape, or round if equipped with an anti-revolving pin (not shown).

In this embodiment, the side surface in nozzle side of head 2 and the surface of slit 27 should preferably form a single flat plane. In such constitution, where there is no unnecessary unevenness, the paint does not find any place to stay on the slit surface 27; this prevents the occurrence of striped painting caused by clot of paint. The end of nozzle 1 has flat surface, with both upsteram lip 14 and downstream lip 15. By assuming this shape, the accuracy in the flatness and straightness can be controlled below 10 μm. This makes it possible to produce a coating layer having homogeneous layer thickness in the direction of width of base sheet.

The gap between the end of nozzle 1 and base material 12 held by roll 13 is preferably to be not more than 2 mm. If it is more than 2 mm the volume of paint existing in the gap between the end of nozzle 1 and the base material 12 turns out to be too much to be completely sucked to inside of nozzle 1; this causes a difficulty in making the ending edge straight.

In this embodiment, a paint of viscosity poise 5 containing carbon powder having average grain diameter 5 um was applied intermittently using four differnt nozzles, viz. surface length L1 of downstream lip 15 of each is 0,1 mm, 2 mm, 3 mm, and 4 mm, on a film of 20 μm thick as the base material 12. A cycle of 100 mm coating followed by 10 mm uncoat in the running direction of base material 12 was repeated. Speed of the film is 20 m/min, volume of application 80 cc/m².

By doing in accordance with this embodiment wherein nozzles of 0.1 mm, 2 mm, and 3 mm L1 length were experimented, the ending edge 22 and the starting edge 24 of area 23 coated with paint 11 on base material 12 were made to have a straight line shape, furthermore it implemented an intermittent coating having homogeneous thickness on the film in the running direction, without causing the thicker application at the starting edge 24, as shown in FIG. 16. On the other hand, in an intermittent coating conducted with nozzle having L1 length longer than 4 mm and in a prior art intermittent coating made with the same setup the ending edge 22 and the starting edge 24 of coated area 23 showed trouble, and the starting edge 24 was thicker, as shown in FIG. 15. The above results reveal the effectiveness of this embodiment.

Figure 4:
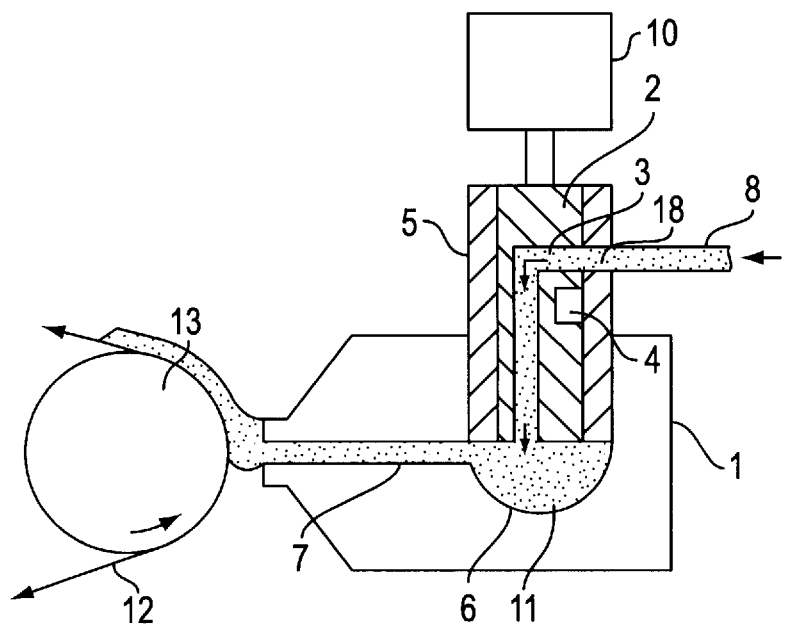
FIG. 4 is cross sectional side view showing an intermittent coating apparatus in application action, according to a third embodiment of the present invention.
Figure 5:
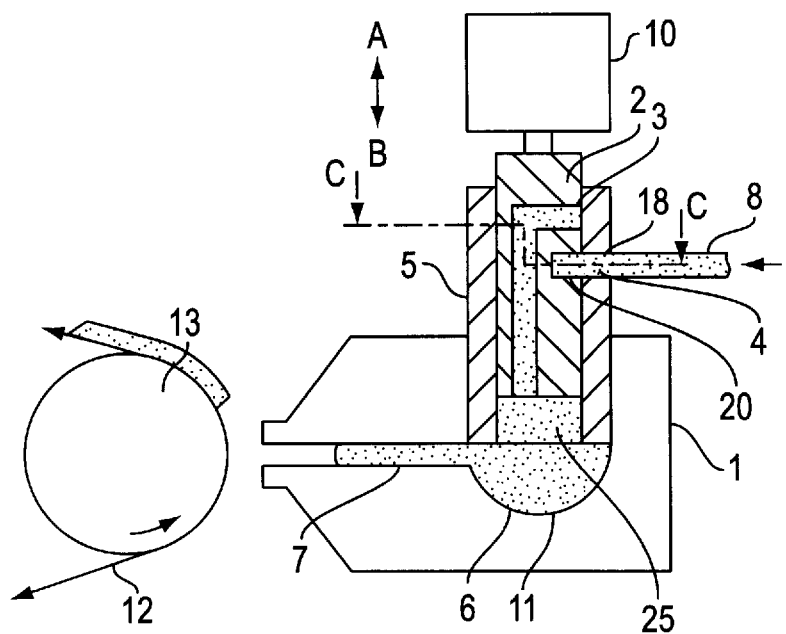
FIG. 5 is cross sectional side view showing the above intermittent coating apparatus while application action is suspended.
Figure 6:
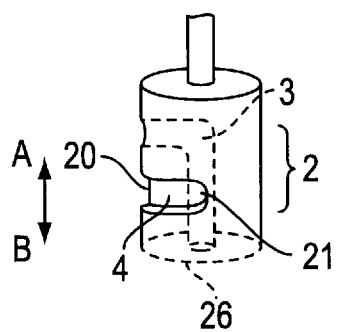
FIG. 6 is perspective view of head of the above intermittent coating apparatus.

Next, a third embodiment is described hereunder referring to FIGS. 4 through 6.

The third embodiment relates to an intermittent coating apparatus; wherein, as showin in FIG. 6 and FIG. 7, a straight line passing through entrance 20 and exit 21 of return path 4 provided in head 2 and the moving direction of head 2 are in a twisted positioning, and the entrance 20 and the paint intake 18 provided in housing 5 are positioned on a same straight line running in parallel with the moving direction of head 2. The rest of constituents remain the same as in embodiment 1 above.

With the above mentioned constitution, the operation is described below. FIG. 4 shows the apparatus at work applying paint 11 on base material 12; FIG. 5 shows the apparatus when application work is suspended.

While at applying work, a pump(not shown) makes paint 11 going through supply pipe 8 to intake 18 of housing 5, to supply channel 3 of head 2, manifold 6 of nozzle 1, and the paint is pushed out of slit 7 to be applied on base material 12 which is running continuously held by roll 13.

When the application work is suspended, sucking part 25 is formed by the shifting of head 2 in the direction A, and the paint staying between the end of nozzle 1 and base material 12 and at the exit of slit 7 is sucked to inside of nozzle 1. This makes the shape of ending edge of coated area straight, when paint application work is stopped. The sucking volume of paint 11 is equal to the space 25 formed by the shift of head 2. The entrance of supply channel 3 is closed with the sliding surface of housing 5, and paint 11 goes from supply pipe 8 to return pipe 9 through intake 18 of housing 5 via return channel 4 of head 2.

A largest significance with this embodiment is that, as shown in FIG. 6 and FIG. 7, a straight line passing through entrance 20 and exit 21 of return path 4 provided in head 2 and the moving direction of head 2 are in a twisted positioning, and the entrance 20 and the paint intake 18 provided in housing 5 are positioned on a same straight line running in parallel with the moving direction of head 2. By this constitution, the shifting quantity of head 2 can be made small.

The reason why is that: The shifting quantity of head 2 depends on the stroke needed for head 2 to switch a coupling of intake 18 of housing 5 with the entrance of supply channel 3 established during application work to another coupling with the entrance 20 of return path 4 for suspension of the application work. In this embodiment, entrance 20 of return path 4 and intake 18 of housing are located on a same straight line running in parallel with the moving direction of head 2, therefore the shifting quantity of head 2 is decided by the distance between entrance 20 of return path 4 and intake 18 during the application work.

Furthermore, because a straight line passing through entrance 20 and exit 21 of return path 4 provided in head 2 and the moving direction of head are in a twisted positioning, the location of exit 21 for returning paint 11 can be placed at any location regardless of the shifting quantity needed for head 2.

The small shifting quantity of head 2 makes it possible to reduce the quantity required for head 2 to shift in order to suck paint 11 into inside of nozzle 1 at suspension of application work, viz. the shifing time of head 2 can be shortened. As a result, the working time for head 2 to suck paint 11 can be shortened, therefore even when the application volume is high the ending edge 23 and the starting edge 24 of paint 11 applied on base material 12 are made to keep a straight line form.

Figure 7A:
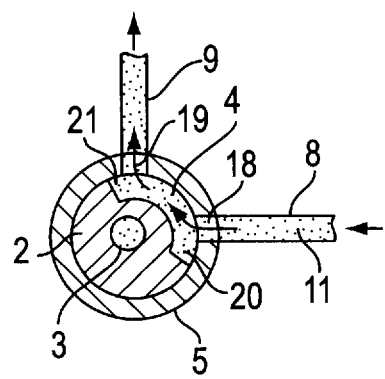
FIG. 7 shows cross section at C—C in a third embodiment (FIG. 5) of the present invention: (a) shows the return channel provided in the circumferential part of head, (b) shows the return channel provided passing through head.
Figure 7B:
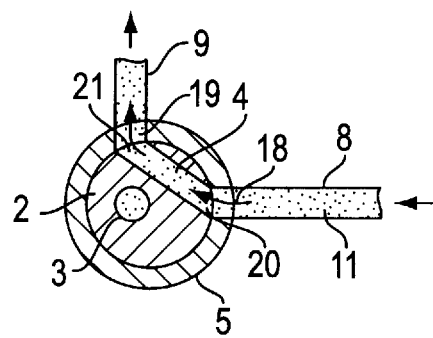

The return path 4 may be provied in a form of groove on the circumferential surface of head 2 as illustrated in FIG. 7(a), or as a through hole as illustrated in FIG. 7(b).

The shifting quantity of head 2 should be not less than 0.1 mm and not more than 50 mm. If it is smaller than the above range, paint 11 can not surely be sucked into nozzle 1, rendering the intermittent coating impossible. If it is larger than the above range, the shifting of head 2 takes too much time, and the ending edge is not maintained in a straight line shape.

In this embodiment, paint 11 is surely returned, therefore the paint pressure in supply pipe 8 never increases when application work is suspended. Therefore, at resuming of the application work, when head 2 is moved in the direction B to start supplying paint to nozzle 1, increase of paint pressure in nozzle 1 is not caused. This prevents the occurrence of the thicker coating at the starting edge.

In order to prevent head 2 from revolving, the cross section of which may have either a square or a polygon shape, or round if equipped with an anti-revolving pin(not shown).

In this embodiment, a paint of viscosity poise 5 containing carbon powder having average grain diameter 5 $\mu$m is applied intermittently on a film of 20 $\mu$m thick as the base material 12. Shifting of head 2 is 10 mm. A cycle of 100 mm coating followed by 10 mm uncoat in the running direction of base material 12 is repeated. Speed of the film is 20 m/min, volume of application 80 cc/m$^2$.

By doing in accordance with this embodiment, the ending edge 22 and the starting edge 24 of area 23 coated with paint 11 were made to have a straight line shape, furthermore it implemented an intermittent coating having homogeneous thickness on the film in the running direction, without causing the thicker application at the starting edge 24, as shown in FIG. 16. On the other hand, in a prior art intermittent coating conducted with the same setup the ending edge 22 and the starting edge 24 of coated area 23 showed trouble, and the starting edge 24 was thicker, as shown in FIG. 15. The above results reveal the effectiveness of this embodiment.

Figure 8:
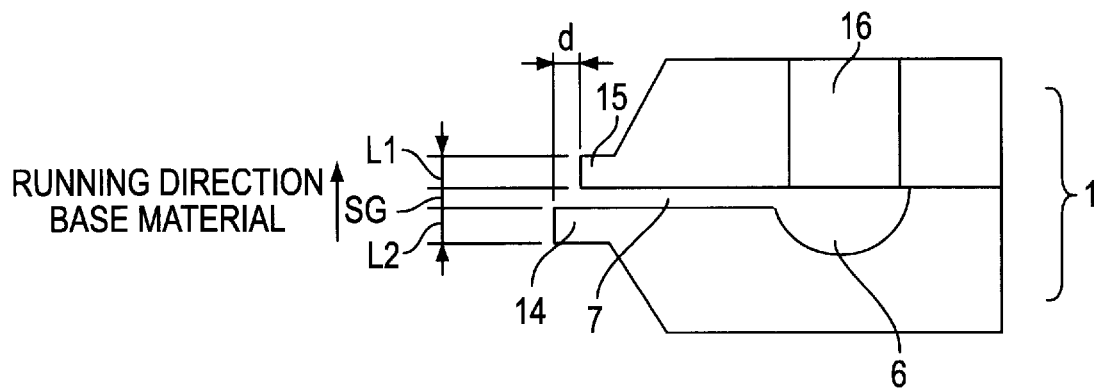
FIG. 8 is cross sectional side view showing head of an intermittent coating apparatus according to a fourth embodiment of the present invention.

Next, a fourth embodiment is described referring to FIG. 8.

A most significant feature of the fourth embodiment is in the end shape of nozzle 1, as shown in FIG. 8. The upstream lip 14 locating in the upstream of slit 7 in the running directon of base material 12 is extruding towards the base material from the downstream lip 15 locating in the downstream of slit 7; the quantity of extrusion d is not less than 5 $\mu$m, and not more than 1000 $\mu$m.

Defining the surface length of upstream lip 14 as L2 and that of downstream lip 15 as L1; 0.1 mm$\leq$L1$\leq$3 mm. More preferably, 0.1$\leq$L1$\leq$2 mm. Although there is no specific limitation with respect to L2, normally it is more than 0.2 mm and less than 5 mm. Hole 16 is to attach housing 5 as shown in FIG. 1. The rest of the constituents remain the same as in embodiment 1 above.

With the above constitution, description is made only on the effects specific to this embodiment, omitting description on the intermittent coating operation as it is conducted here in the same way as in the first and the second embodiments.

By making upstream lip 14 to extrude towards base material 12, the gap between upstream lip 14 and base material 12 can be made smaller. As a result, the volume of paint 11 existing in the gap during application is reduced, therefore paint 11 is thoroughly sucked into nozzle 1 when application work is suspended, and the ending edge 22 and the starting edge 24 of area 23 coated with paint 11 on base material 12 are made to have a straight line shape.

If the extrusion d is smaller than 5 $\mu$m the effect of the present invention is affected because of the large staying volume of paint 11. An extrusion d larger than 1000 $\mu$m makes the gap between downstream lip 15 and base material 12 too long, which makes the volume of paint 11 existing in the gap too much to be thoroughly sucked into nozzle 1 at suspension of the application work; this causes a disturbance on ending edge 22 and starting edge 24 of coated area 23.

If the surface length L1 of downstream lip 15 is smaller than 0.1 mm, the volume of paint in the part 17 surely decreases; however too short a length does not provide sufficient pressure between downstream lip 15 and base material 12, and the homogeniety in the width direction of the layer thickness is affected. If it is longer than 3 mm, the volume of paint at the part 17 goes too much to maintain the ending edge 22 and the starting edge 24 of coated area 23 straight. When paint 11 has a high viscosity, higher than poise 1, it turns out to be difficult to suck paint in the part 17 into nozzle 1. Therefore, L1 is preferably to be less than 2 mm.

In this embodiment, a paint of viscosity poise 5 containing carbon powder having average grain diameter 5 μm was applied intermittently using four differnt nozzles, viz. surface length L1 of downstream lip 15 is 2 mm, while extrusion d of upstream lip 14 of each is 3 μm, 5 μm, 1000 μm and 1100 μm, on a film of 20 μm thick as the base material 12. A cycle of 100 mm coating followed by 10 mm uncoat in the running direction of base material 12 was repeated. Speed of the film is 20 m/min, volume of application 80 cc/m$^2$.

By doing in accordance with this embodiment wherein nozzles having 5 μm extrusion d and 1000 μm extrusion d in upstream lip 14 were experimented, the ending edge 22 and the starting edge 24 of area 23 coated with paint 11 on base material 12 were made to have a straight line shape, furthermore it implemented an intermittent coating having homogeneous thickness on the film in the running direction, without causing the thicker application at the starting edge 24, as shown in FIG. 16. On the other hand, in an intermittent coating conducted with nozzles having 3 μm extrusion d and 1100 μm extrusion d in upstream lip 14, and in a prior art intermittent coating made with the same setup the ending edge 22 and the starting edge 24 of coated area 23 showed trouble, and the starting edge 24 was thicker, as shown in FIG. 15. The above results reveal the effectiveness of this embodiment.

A fifth embodiment is described below referring to FIGS. 9 through 11.

Figure 9:
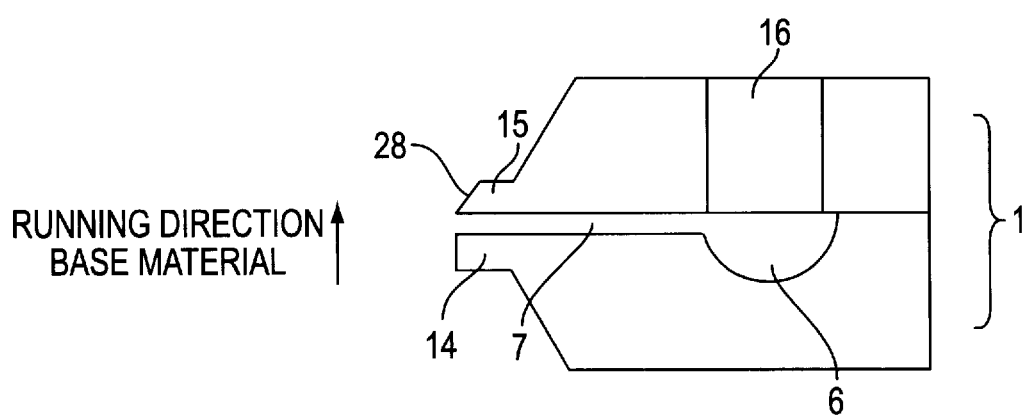
FIG. 9 is cross sectional side view showing head of an intermittent coating apparatus according to a fifth embodiment of the present invention.

A most significant feature of the fifth embodiment is in the lip end shape of nozzle 1, as shown in FIG. 9. The end 28 of downstream lip 15 located in downstream of slit 7 in the running direction of base material 12 is provided with a sharp edge. Although there is no specific restriction with respect to upstream lip 14, its surface length in the running direction of base material 12 is normally not less than 0.2 mm and not more than 5 mm. The hole 16 is to attach housing 5 as shown in FIG. 1. Other constituents remain the same as in the embodiment 1 above.

Figure 10:
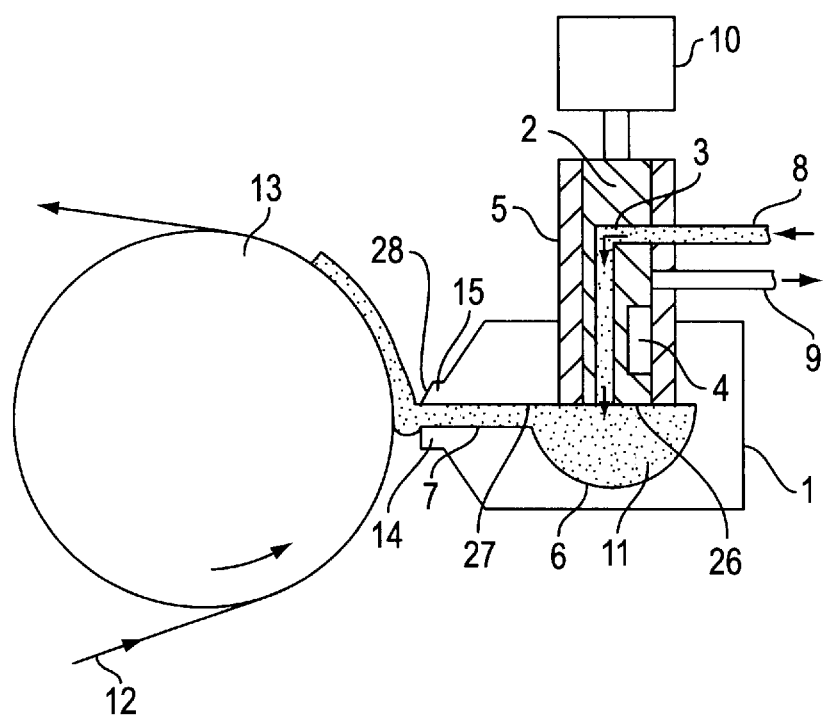
FIG. 10 is cross sectional side view showing the above coating apparatus in application action.
Figure 11:
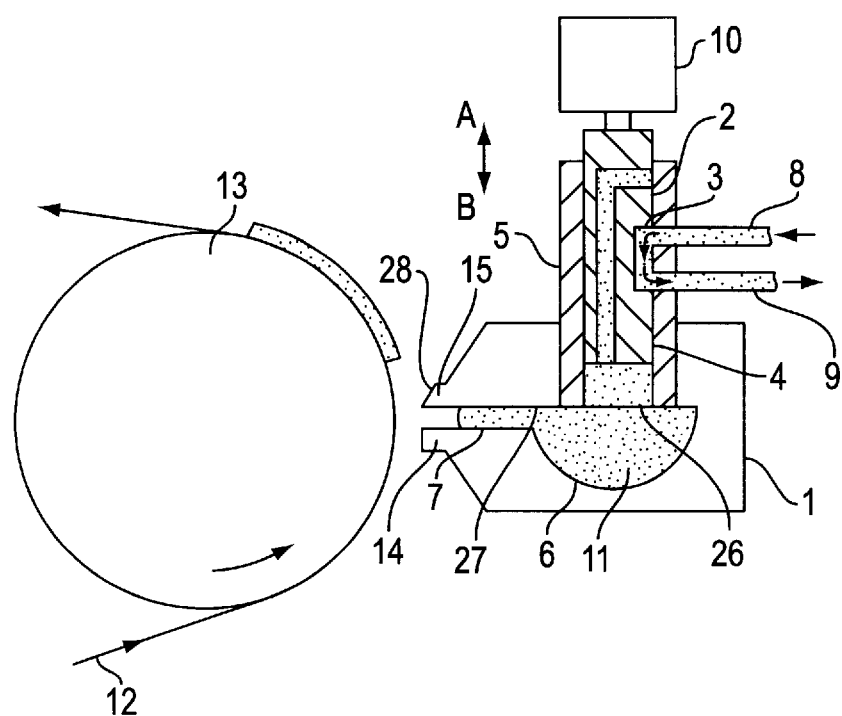
FIG. 11 is cross sectional side view showing the above coating apparatus while application action is suspended.

In the above constitution, FIG. 10 shows a state wherein paint 11 is being applied on continuously running base material 12 with nozzle 1 according to this embodiment, FIG. 11 shows that when the application is suspended.

While at applying work, a pump(not shown) makes paint 11 going through supply pipe 8 to intake 18 of housing 5, to supply channel 3 of head 2, manifold 6 of nozzle 1, and the paint is pushed out of slit 7 to be applied on base material 12 which is continuously running held by roll 13.

When the application work is suspended, sucking part 25 is formed by the shifting of head 2 in the direction A, and the paint staying between the end of nozzle 1 and base material 12 and at the exit of slit 7 is sucked to inside of nozzle 1. In this embodiment, because the end 28 of downstream lip 15 is sharp-edged there exists no paint staying between downstream lip 15 and base material 12, therefore the volume of paint to be sucked by the shifting of head 2 is very small and the paint 11 existing between nozzle 1 and base material 12 is completely sucked in to inside of nozzle 1. As a result, the ending edge 22 and the starting edge 24 of coated area 23 are made to have a straight line shape even if the application volume is high.

In this embodiment, a paint of viscosity poise 5 containing carbon powder having average grain diameter 5 μm was applied intermittently on a film of 20 μm thick as the base material 12. A cycle of 100 mm coating followed by 10 mm uncoat in the running direction of base material 12 was repeated. Speed of the film is 20 m/min, volume of application 80 cc/m$^2$.

By doing in accordance with this embodiment, the ending edge 22 and the starting edge 24 of area 23 coated with paint 11 were made to have a straight line shape, furthermore it implemented an intermittent coating having homogeneous thickness on the film in the running direction, without causing the thicker application at the starting edge 24, as shown in FIG. 16. On the other hand, in a prior art intermittent coating conducted with the same setup the ending edge 22 and the starting edge 24 of coated area 23 showed trouble, and the starting edge 24 was thicker, as shown in FIG. 15. The above results reveal the effectiveness of this embodiment.

Now, a sixth embodiment is described.

The sixth embodiment relates to an intermittent coating method, and reference is made to FIG. 1 and FIG. 2. An intermittent coating method according to this embodiment comprises a process to apply paint 11, which is supplied to nozzle 1 by head 2, on continuously running base material 12 and a process to stop the application, wherein the process to stop the application suspends flow of paint 11 to nozzle 1, feeds the flow to a place other than nozzle 1, at the same time sucks paint 11 staying in the inside of nozzle 1 and at the exit of slit 7 into sucking part 25 provided within nozzle 1, while the process to apply paint releases flow of paint 11 to nozzle 1 and returns paint 11 that was sucked into sucking part 25 to inside of nozzle 1; and the volume of paint 11 to be sucked is regulated to be not less than 0.1 mm$^3$ and not more than 500 mm$^3$ per 10 mm slit width; thereby paint 11 is applied intermittently on base material 12.

While at applying work, a pump(not shown) makes paint 11 going through supply pipe 8 to intake 18 of housing 5, to supply channel 3 of head 2, manifold 6 of nozzle 1, and the paint is pushed out of slit 7 to be applied on base material 12 which is continuously running held by roll 13.

When suspending the application work, sucking part 25 is formed by shifting head 2 in the direction A, and paint 11 staying between the end of nozzle 1 and base material 12 and at the exit of slit is sucked to inside of nozzle 1. This makes the shape of ending edge of coated area straight, when paint application work is stopped. The volume of paint 11 sucked equals to the space of sucking part 25 created by the shifting of head 2, which means that the sucking part for sucking paint 11 is formed without fail by the shift of head 2, and the volume of sucking part 25 is mechanically decided, therefore the reproducibility of intermittent application is secured.

The entrance of supply channel 3 is closed with the sliding surface of housing 5, and paint 11 goes from supply pipe 8 to return pipe 9 through intake 18 of housing 5 via return path 4 of head 2. In this way, the increase of paint pressure in supply pipe 8 at the supension of application work is suppressed. Therefore, at resuming of the application, when head 2 is moved in the direction B to start supplying paint to nozzzle 1, the pressure of paint in nozzle 1 never goes up. This prevents the occurrence of the thicker coating at the starting edge.

The return pressure during suspension and the nozzle pressure during application work can be made to be equal by properly regulating the flow volume of paint 11 guided to a place other than nozzle 1, namely to return piping 9. This makes it possible to resume application work with a specified coating thickness from the starting.

A most significant feature of this embodiment is in the quantity of paint sucked by head 2 to the inside of nozzle 1. The quantity of paint to be sucked should be not less than 0.1 mm$^3$ and not more than 500 mm$^3$ per 10 mm slit width. If it is less than the specified, paint 11 remains between nozzle 1 and base material 12 because of insufficient sucking, and the starting edge and the ending edge of coating can not be maintained in a straight line shape.

If paint 11 is sucked more than the specified, the ending edge is made to a straight line shape but the starting edge gets disturbance. The reason why: When suspending the applicating work, head 2 is moved to the direction A to suck the paint to sucking part 25. If the sucking volume is too much the paint is withdrawn to the internal part of slit 7. At the restarting of coating, paint 11 that was sucked is pushed out. While proceeding along inside of slit 7, the paint embraces the air, and as a result the paint layer at the starting edge carries with it the air, which gives disturbance to the starting edge of coating and affects the product quality.

In order to prevent head 2 from revolving, the cross section of which may have either a square or a polygon shape, or round if equipped with an anti-revolving pin(not shown).

Another significance with this embodiment is that by simply moving head 2 in the direction A three functions, viz., shut, return and suck, are performed at the same time; namely, the supply of paint 11 to nozzle 1 is shut and made to return, and paint 11 staying between the end of nozzle 1 and base material 12 and at the exit of slit 7 is sucked in to the inside of nozzle 1.

In this embodiment, during application work, the side surface in nozzle side of head 2 and the surface of slit 27 should preferably form a single flat plane. In such constitution, where there is no unnecessary unevenness, the paint does not find any place to stay on the slit surface 27; this prevents the ocurrence of striped painting caused by clot of paint.

Although the end of nozzle 1 in FIG. 1 has flat surface, it is not necessarily to be flat in this embodiment. It may either be, for example, a curved shape having a certain radius, a polygon or a sharp edged shape.

The gap between the end of nozzle 1 and base material 12 held by roll 13 is preferably to be not more than 2 mm. If it is more than 2 mm the volume of paint existing in the gap between the end of nozzle 1 and the base material turns out to be too much to be completely sucked to inside of nozzle 1; this causes a difficulty in making the ending edge straight.

In this embodiment, a paint of viscosity poise 5 containing carbon powder having average grain diameter 5 μm is applied intermittently on a film of 20 μm thick as the base material. A cycle of 100 mm coating followed by 10 mm uncoat in the running direction of base material 12 is repeated. Speed of the film is 20 m/min, volume of application 80 cc/m$^2$.

By doing in accordance with this embodiment, the ending edge 22 and the starting edge 24 of area 23 coated with paint 11 are made to have a straight line shape, furthermore it implements an intermittent coating having homogeneous thickness on the film in the running direction, without causing the thicker application at the starting edge 24, as shown in FIG. 16. On the other hand, in a prior art intermittent coating conducted with the same setup the ending edge 22 and the starting edge 24 of coated area 23 showed trouble, and the starting edge 24 was thicker, as shown in FIG. 15. The above resutls reveal the effectiveness of this embodiment.

Next, a seventh embodiment is described in the following.

Figure 12:
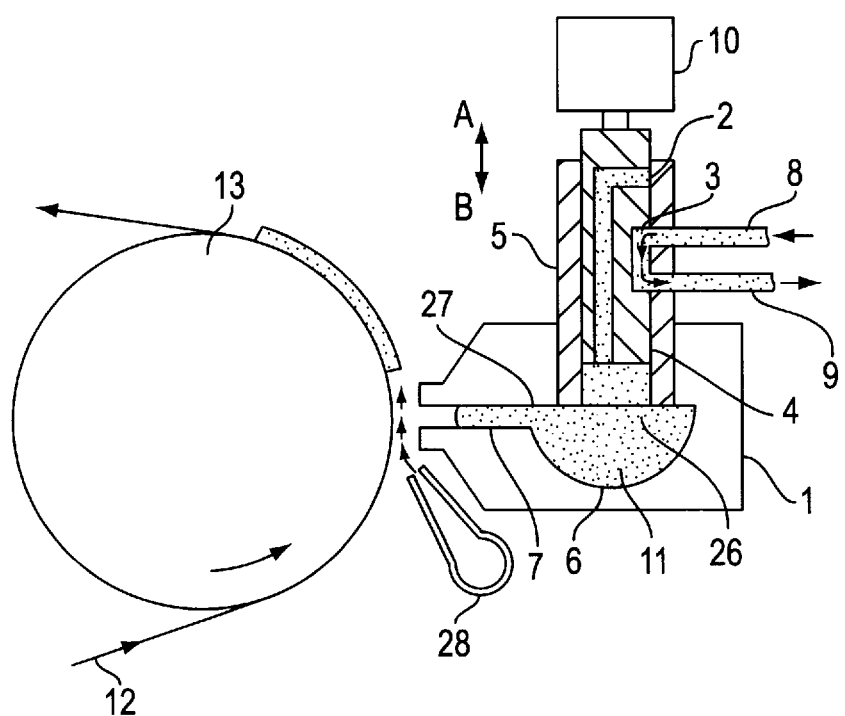
FIG. 12 is cross sectional side view showing an apparatus, while application action is suspended, for an intermittent coating method according to a seventh embodiment of the present invention.

The seventh embodiment relates to an intermittent coating method, which is described referring to FIG. 12. An intermittent coating method according to this embodiment comprises a process to apply paint 11, which is supplied to nozzle 1 by head 2, on continuously running base material 12 and a process to stop the application; wherein the process to stop the application blows the air from air nozzle 28 to a space between the end of nozzle 1 and base material 12, suspends flow of paint 11 to nozzle 1, feeds the flow to a place other than nozzle 1, at the same time sucks paint 11 staying in the inside of nozzle 1 and at the exit of slit 7 into sucking part 25 provided within nozzle 1, whereas the process to apply paint releases flow of paint 11 to nozzle 1 and returns paint 11 that was sucked into sucking part 25 to inside of nozzle 1, and paint 11 is intermittently applied on base material 12.

While in application operation, a pump(not shown) makes paint 11 going through supply pipe 8 to intake 18 of housing 5, supply channel 3 of head 2, manifold 6 of nozzle 1, and the paint is pushed out of slit 7 to be applied on base material 12 which is continuously running held by roll 13.

When the application work is suspended, sucking part 25 is formed by shifing head 2 in the direction A, and paint 11 staying between the end of nozzle 1 and base material 12 and at the exit of slit 7 is sucked to inside of nozzle 1. At the same time, the air is blown from air nozzle 28 to a space between nozzle 1 and base material 12 in the direction of slit width to blow off paint staying in the space; which is a largest significance with this embodiment. This creates a state that there is completely no paint staying between nozzle 1 and base material 12, which makes the ending edge of coating to have a straight line shape.

The entrance of supply channel 3 is closed with the sliding surface of housing 5, and paint 11 goes from supply pipe 8 to return pipe 9 through intake 18 of housing 5 via return path 4 of head 2. In this way, the increase of paint pressure in supply pipe 8 at the suspension of application work is suppressed. Therefore, at resuming of the application, when head 2 is moved in the direction B to start supplying paint to nozzle 1, the pressure of paint in nozzle 1 never goes up. This prevents the occurrence of the thicker coating at the starting edge.

In order to prevent head 2 from revolving, the cross section of which may have either a square or a polygon shape, or round if equipped with an anti-revolving pin(not shown). Although the end of nozzle 1 in FIG. 12 has flat surface, it is not necessarily to be flat in this embodiment. It may either be, for example, a curved shape having a certain radius, a polygon or a sharp edged shape.

In this embodiment, a paint of viscosity poise 5 containing carbon powder having average grain diameter 5 μm is applied intermittently on a film of 20 μm thick as the base material. A cycle of 100 mm coating followed by 10 mm uncoat in the running direction of base material 12 is repeated. Speed of the film is 20 m/min, volume of application 80 cc/m$^2$.

By doing in accordance with this embodiment, the ending edge 22 and the starting edge 24 of area 23 coated with paint 11 are made to have a straight line shape, furthermore it implements an intermittent coating having homogeneous thickness on the film in the running direction, without causing the thicker application at the starting edge 24, as shown in FIG. 16. On the other hand, in a prior art intermittent coating conducted with the same setup the ending edge 22 and the starting edge 24 of coated area 23 showed trouble, and the starting edge 24 was thicker, as shown in FIG. 15. The above results reveal the effectiveness of this embodiment.

In the following, an eighth embodiment is described.

Figure 13:
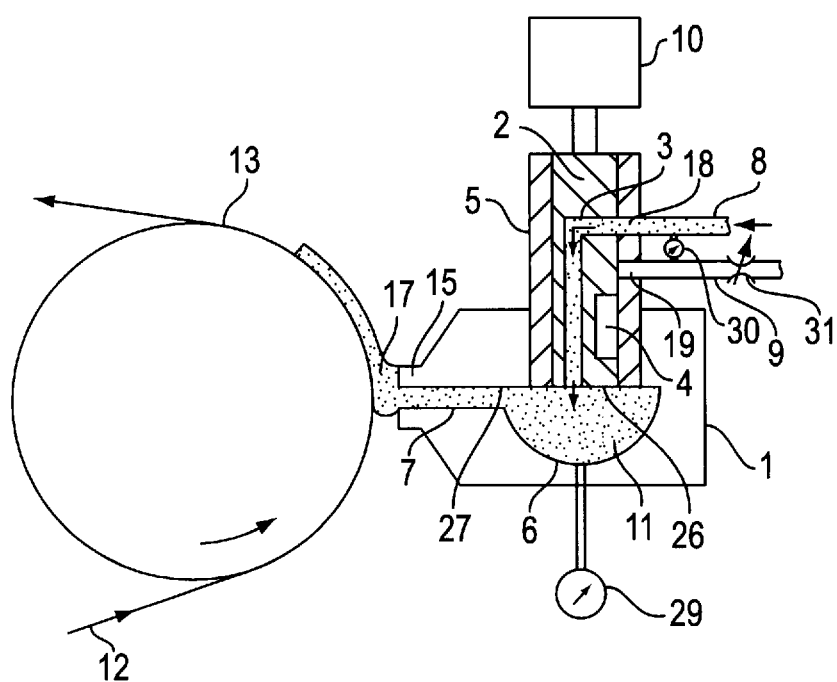
FIG. 13 is cross sectional side view showing an apparatus, in application action, for an intermittent coating method according to an eighth embodiment of the present invention.
Figure 14:
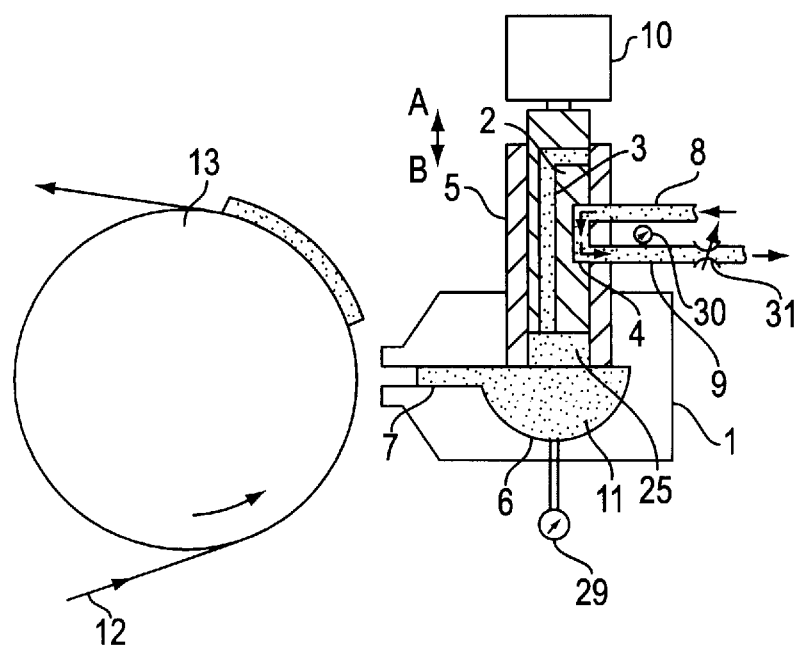
FIG. 14 is cross sectional side view showing an apparatus, while application action is suspended, for the above intermittent coating method.

The eighth embodiment relates to an intermittent coating method, which is described referring to FIG. 13 and FIG. 14. An intermittent coating method according to this embodiment comprises a process to apply paint 11, which is supplied to nozzle 1 by head 2, on continuously running base material 12 and a process to stop the application, wherein the process to stop the application suspends flow of paint 11 to nozzle 1, feeds the flow to a place other than nozzle 1, at the same time sucks paint 11 staying in the inside of nozzle 1 and at the exit of slit 7 into sucking part 25 provided within nozzle 1, whereas the process to apply paint releases flow of paint 11 to nozzle 1 and returns paint 11 that was sucked into sucking part 25 to inside of nozzle 1; and the internal pressure of nozzle 1 or the pressure in piping just before the nozzle during application work and the pressure of flow of paint 11 guided to a place other than nozzle 1 at suspension of application work are made to be equal, and paint 11 is intermittently applied on base material 12.

While in application operation, a pump(not shown) makes paint 11 going through supply pipe 8 to intake 18 of housing 5, supply channel 3 of head 2, manifold 6 of nozzle 1, and the paint is pushed out of slit 7 to be applied on base material 12 which is continuously running held by roll 13.

When the application work is suspended, sucking part 25 is formed by shifing head 2 in the direction A, and paint 11 staying between the end of nozzle 1 and base material 12 and at the exit of slit 7 is sucked to inside of nozzle 1. This makes the shape of ending edge of coated area straight, when paint application work is stopped. The volume of paint 11 to be sucked equals to the space of sucking part formed by the position shifting of head 2, which means that a sucking part for sucking paint 11 is formed without fail by the shift of head 2, and the volume of sucking part 25 is mechanically decided, therefore the reproducibility of intermittent application is secured.

The entrance of supply channel 3 is closed with the sliding surface of housing 5, and paint 11 goes from supply pipe 8 to return pipe 9 through intake 18 of housing 5 via return path 4 of head 2. The return pressure at suspension and the nozzle pressure during application work can be made to be equal by properly regulating the flow quantity of paint 11 guided to a place other than nozzle 1, namely to return pipe 9. This makes it possible to resume application work with a specified coating thickness from the starting.

A largest significance with this embodiment is that a pressure gauge 30 and a flow regulator valve 31 are provided in return pipe 9, and a pressure gauge 29 in nozzle 1 so that the pressure at suspension of coating in return pipe 9 is regulated by the flow regulator valve 31 so to be equal to the pressure in nozzle 1 during application work. If the pressure in pipe 9 at return is low the coating thickness turns out to be thin when application work is resumed, because of decreased paint supply to nozzle 1; however by virtue of the above described constitution according to the present invention the application work can be resumed with a specified coating thickness from the starting.

The increase of paint pressure in supply pipe 8 at the suspension of application work is also suppressed. Therefore, at resuming of the application, when head 2 is moved in the direction B to start supplying paint to nozzle 1, the pressure of paint in nozzle 1 never goes up. This prevents occurrence of the thicker coating at the starting edge.

Although the end of nozzle 1 in FIG. 13 and FIG. 14 has flat surface, it is not necessarily to be flat in this embodiment. It may either be, for example, a curved shape having a certain radius, a polygon or a sharp edged shape.

The gap between the end of nozzle 1 and base material 12 held by roll 13 is preferably to be not more than 2 mm. If it is more than 2 mm the volume of paint existing in the gap between the end of nozzle 1 and the base material 12 turns out to be too much to be completely sucked to inside of nozzle 1 when application work is suspended; this causes a difficulty in making the ending edge straight.

In this embodiment, a paint of viscosity poise 5 containing carbon powder having average grain diameter 5 $\mu$m is applied intermittently on a film of 20 $\mu$m thick as the base material. A cycle of 100 mm coating followed by 10 mm uncoat in the running direction of base material is repeated. Speed of the film is 20 m/min, volume of application 80 cc/m$^2$.

By doing in accordance with this embodiment, the ending edge 22 and the starting edge 24 of area 23 coated with paint 11 are made to have a straight line shape, furthermore it implements an intermittent coating having homogeneous thickness on the film in the running direction, without causing the thicker application at the starting edge 24, as shown in FIG. 16. On the other hand, in a prior art intermittent coating conducted with the same setup the ending edge 22 and the starting edge 24 of coated area 23 showed trouble, and the starting edge 24 was thicker, as shown in FIG. 15. The above results reveal the effectiveness of this embodiment.

Next, a ninth embodiment is described.

The ninth embodiment relates to an intermittent coating method, which is described referring to FIGS. 1 through 3. An intermittent coating method according to this embodiment comprises a process to apply paint 11, which is supplied to nozzle 1 by head 2, on continuously running base material 12 and a process to stop the application, wherein the process to stop the application suspends flow of paint 11 to nozzle 1, feeds the flow to a place other than nozzle 1, at the same time sucks paint 11 staying in the inside of nozzle 1 and at the exit of slit 7 into sucking part 25 provided within nozzle 1, whereas the process to apply paint releases flow of paint 11 to nozzle 1 and returns paint 11 that was sucked into sucking part 25 to inside of nozzle 1; and the length L1 of downstream lip 15 of nozzle 1 in the running direction of base material 12 should be set within a range 0.1 mm$\leq$L1$\leq$3 mm. More preferably 0.1 mm$\leq$L1$\leq$2 mm. Although there is no specific limitation with respect to L2, normally it is more than 0.2 mm and less than 5 mm. The quantity of paint 11 to be sucked is not less than 0.1 mm$^3$ and not more than 500 mm$^3$ per 10 mm slit width of nozzle 1. In this way, paint 11 is intermittently applied on base material 12. If the surface length L1 of downstream lip 15 in the running direction of base material 12 is shorter than 0.1 mm, the volume of paint in the part 17 surely decreases; however too short a lenth does not provide sufficient pressure between downstream lip 15 and base material 12, and the homogeniety in the width direction of the layer thickness is affected. If it is longer than 3 mm, the volume of paint at the part 17 goes too much to maintain the ending edge 22 and the starting edge 24 of coated area 23 straight. When paint 11 has a high viscosity, higher than poise 1, it turns out to be difficult to suck paint in the part 17 into nozzle 1. Therefore, L1 is preferably to be less than 2 mm.

While in application operation, a pump(not shown) makes paint 11 going through supply pipe 8 to intake 18 of housing 5, supply channel 3 of head 2, manifold 6 of nozzle 1, and the paint is pushed out of slit 7 to be applied on base material 12 which is continuously running held by roll 13.

When the application work is suspended, sucking part 25 is formed by shifing head 2 in the direction A, and paint 11 staying between the end of nozzle 1 and base material 12 and at the exit of slit 7 is sucked to inside of nozzle 1. This makes the shape of ending edge of coated area straight, when paint application work is stopped. The volume of paint 11 to be sucked equals to the space of sucking part 25 formed by the position shifting of head 2.

The entrance of supply channel 3 is closed with the sliding surface of housing 5, and paint 11 goes from supply pipe 8 to return pipe 9 through intake 18 of housing 5 via return path 4 of head 2. Therefore, the increse of paint pressure in supply pipe 8 when application work is suspended is suppressed. At resuming of the application work, when paint supply to nozzle 1 is started by shifting head 2 in the direction B, the paint pressure in nozzle 1 never goes up; this prevents the occurrence of the thicker coating at the starting edge.

Another material significance with this embodiment is in the quantity of paint 11 to be sucked to inside of nozzle 1 of head 2. Namely, the quantity of paint 11 to be sucked has to be not less than 0.1 mm$^3$ and not more than 500 mm$^3$ per 10 mm slit width of nozzle 1. When the quantity is less than the above specified, paint 11 remains in a space between nozzle 1 and base material 12 because of insufficient sucking; this makes it impossible to keep the starting and ending edges of coated area in a straight line shape. If paint is sucked more than specified above, although the ending edge is kept straight the starting edge gets disturbance.

The reason why is that, when suspending the application work, head 2 is moved to the direction A to suck the paint to sucking part 25; if the sucking volume is too much the paint is withdrawn to the internal part of slit 7. At the restarting of coating, paint 11 that was sucked is pushed out. While proceeding along inside of slit 7, the paint embraces the air, and as a result the paint layer at the starting edge carries with it the air, which gives disturbance to the starting edge of coating and affects the product quality.

In this embodiment, a paint of viscosity poise 5 containing carbon powder having average grain diameter 5 $\mu$m is applied intermittently on a film of 20 $\mu$m thick as the base material. A cycle of 100 mm coating followed by 10 mm uncoat in the running direction of base material is repeated. Speed of the film is 20 m/min, volume of application 80 cc/m$^2$.

By doing in accordance with this embodiment, the ending edge 22 and the starting edge 24 of area 23 coated with paint 11 are made to have a straight line shape, furthermore it implements an intermittent coating having homogeneous thickness on the film in the running direction, without causing the thicker application at the starting edge 24, as shown in FIG. 16. On the other hand, in a prior art intermittent coating conducted with the same setup the ending edge 22 and the starting edge 24 of coated area 23 showed trouble, and the starting edge 24 was thicker, as shown in FIG. 15. The above results reveal the effectiveness of this embodiment.

A tenth emobodiment is described in the following.

The tenth embodiment relates to a manufacturing method of battery electrodes, which is described referring to FIG. 1 and FIG. 2. In this embodiment, an active material paste is used in place of paint 11, and the paste is applied on an electricity collector body in place of base material 12 as referred to in FIG. 1 and FIG. 2.

A manufacturing method of battery electrodes according to this embodiment comprises a process to apply an active material paste, which is supplied to nozzle 1 by head 2, on a continuously running collector body and a process to stop the application, wherein the process to stop application suspends flow of active material paste to nozzlle 1, feeds the flow to a place other than nozzle 1, and at the same time sucks active material paste staying in the inside of nozzle 1 and at the exit of slit 7 into sucking part 25 provided within nozzle 1, whereas the application process releases flow of the active material paste to nozzle 1 and returns the active material paste that was sucked into sucking part 25 to inside of nozzle 1; in this way an active material paste is applied intermittently on a collector body.

An active material paste used in this embodiment may be made of electrode active material, electro conductive agent, binder, solvent and others, using a batch mixer, a continuous kneader, a dissolver, a homoginizer, etc.

A compound in which H+, Li+, Na+, K+ is insertable or dischargeable is usable as the electrode active material; an oxide containing transition metal chalcogenide, carbon material, etc. as the main body may be used; among others, a lithium containing transition metal oxide, a transition metal oxide, and an oxide containting carbon material as main body are preferred. What are preferred as main body of the transition metal include Mn, Co, Ni, V, Fe; practical examples are $LiCoO_2$, $LiNiO_2$, $LiCo_{0.5}Ni_{0.5}O_2$, $LiMn_2O_4$, $LiCo_{0.9}Al_{0.1}O_2$, $Fe_3O_4$, etc. What is preferred as the carbon material is a one which has the 002 phase distance 3.35–3.8 OA (angstrom), and the density 1.1–1.7 g/cm$^3$; graphite, petroleum coke, cresol resin calcinated carbon, furan resin calcinated carbon, polyacrylonitrile fiber calcinated carbon, vapor phase growth carbon, mesophase pitch calcinated carbon, etc. may be used.

Any electronic conductive material that does not cause any chemical reaction when incorporated in a cell may be used as the electro conductive agent; normally, electro conductive materials such as natural graphite(flake graphite, flake-like graphite, etc.), synthetic graphite, carbon black, acetylene black, Ketjenblack, carbon fiber, etc. may be used singly, or blended to others.

As for the binder, polysaccarides, such as carboxymethyl cellulose (hereinafter referred to as CMC), polyvinyl alcohol, fluoric group resin, formaldehyde group resin, acetal group resin, acryl/styrene group copolymerized resin, styrene/butadiene group copolymerized resin(hereinafter referred to as SBR group resin); a thermo plastic resin and a polymer having rubbery elasticity, may be used singly or blended to others. The binder may either be dissolved, dispersed or suspended in a solvent.

There is no specific limitation with respect to the solvent. What is preferred is a one which has a high polarity; for example, water, ethyle alcohol, N-methylpyrrodidone, toluene, methylethyl ketone, methylisobutyl ketone, cyclohexanone, ethanol, methanol, butylacetate, etc. may be used.

For the collector body, metal foil, inorganic oxide of aluminium, copper, nickel, stainless steel, etc., may be used in a form of continuous body, punched metal, net, etc.

By applying the above described active material paste intermittently on a continuously running collector body according to the above described intermittent coating apparatus, the uncoated part for shaping a lead part is provided on the collector body in the width direction of the collector body; thus, a process to peel off the coated layer is eliminated, and the sticking of fine powder released from the active material layer does not occur; furthermore, as compared with an electrode plate which underwent a peeling-off process, an electrode prepared according to the present embodiment has an increased adhesion of the active material layer to the collector body at the boundary, because of the eliminated mechanical stress that was given when the layer was peeled. By virtue of these effects, a battery having improved discharge capacity, rate characteristic and cycle characteristic is implemented.

In the following, a manufacturing method of lithium secondary battery is described as an embodiment of the present invention.

(Embodiment)

Active material paint for negative electrode is obtained by kneading mesophasepitch calcinated carbon, SBR group resin and 1 wt % CMC aqueous solution using a continuous 2-axle kneader, and filtering through a stainless steel filter having 0.1 mm opening. The paint thus obtained is applied on a copper collector body using an intermittent coating apparatus as described in embodiment 1; in this way a negative electrode sheet having 400 mm coated part and 20 mm uncoated part is prepared.

Active material paint for positive electrode is obtained by kneading $LiCoO_2$, electro conductive carbon black, fluoric group resin and 1 wt % CMC aqueous solution using a continuous 2-axle kneader, and filtering through a stainless steel filter having 0.1 mm opening. The paint thus obtained is applied on an aluminium collector body using the same intermittent coating apparatus as employed for the negative electrode; in this way a positive electrode sheet having 390 mm coated part and 5 mm uncoated part is prepared.

Each of the positive electrode sheet and the negative electrode sheet is slitted to a specified width to be assembled into lithium ion secondary battery of size A.

(Comparative Sample)

Battery electrodes were manufactured each with the same active material paint for positive electrode and the same active material paint for negative electrode as those in the above described embodiment, by continuously applying with the comma-direct-coating method. Each of the positive electrode sheet and the negative electrode sheet thus coated was peeled off in part so as it has the same uncoated part as in the embodiment, and then slitted to a specified width to be assembled into lithium ion secondary battery of size A.

Each of the samples underwent following appraisal:

(1) Rate of voltage failure

Voltage was measured after storing initial-charged batteries in 45° C. thermostatic chamber for 2 weeks and then taking them out to be restored to room temperature. The number of batteries under 3.9V were counted: There was 1 such battery among 1000 units of embodiment samples, whereas 15 among 1000 units of comparative samples.

After disassembling the batteries which showed failure in electricity generation it was found out that electrode plates of comparative samples had falling-down of a substantial volume of active material at the boundary area of peeling, and a number of fell-off active materials were observed. In the embodiment sample, the falling-down of active material at the boundary area was hardly observed, and it was understood that the adhesive strength was improved.

(2) Discharge capacity [mAh]

In room temperature, secondary batteries charged with constant current (160 mA) up to terminal voltage (4.2V) were discharged at constant current (from 160 mA to 3200 mA). The discharge capacity from the start of discharge until the lowering voltage went to the terminal voltage (2.0V) was compared. Among those of the embodiment, it was observed that the spread in capacity was small and the decrease in discharge capacity hardly existed. FIG. 17 is an example of the discharge voltage curve when the discharge capacity was measured.

(3) Cycle life [number of cycles]

In room temperature, the charge/discharge cycle was repeated under specific conditions (discharge: current 1600 mA, terminal voltage 2.0V charge: current 160 mA, terminal voltage 4.2V) to measure the discharge capacity. The number of charge/discharge cycles until the discharge capacity decreased to 90% of the value of initial discharge capacity was compared. Those of the comparative samples decreased to 90% after 600 cycles, while those of embodiment samples hardly showed any deterioration after 1000 cycles, indicating a remakably improved rate of deterioration. Moreover, there was hardly any spread of the capacity among the embodiment samples.

The batteries which underwent the cycle appraisal were disassembled to observe the condition of electrode plates; there was fall-off of active material layer from electrode among the comparative samples; the fall-off of active material layer was remakable at the peeled area. On the other hand, there was hardly any fall-off of active material among the embodiment samples, which indicates that there is hardly any deterioration in the adhesion. Among the comparative samples, there was lithium observed separated on the surface of electrode plate. Through the study conducted with photos of electron microscope it has become known that the lithium separation is caused by the fallen active material acting as a core sticking on the surface of electrode plate. FIG. 18 is an example of discharge capacity shift against the number of charge/discharge cycles when the cycle life test was conducted.

As described above, the effectiveness of an intermittent coating apparatus according to the present invention was confirmed by using it to the maunufacturing method of a lithium secondary battery.

Although in the above embodiment only the manufacturing method of lithium secondary battery was described, the same effects are obtainable in the manufacture of positive electrode, as well as in positive and negative electrodes of NiCd battery or nickel hydrogen battery.

As described in the foregoing descriptions, in an intermittent coating apparatus according to the present invention, paint supplied from an intermittent device is applied through a nozzle on a continuously running base material, wherein the intermittent device is constituted in a way that when to stop the coating the flow of said paint to said nozzle is blocked to be led to a means other than said nozzle, at the same time said paint staying within said nozzle and at the exit of slit is sucked to a place provided within said nozzle, and when to resume the coating the flow of said paint to said nozzle is released, at the same time said paint that was sucked to said place is returned to the inside of said nozzle; so, when the application work is suspended the paint supply to nozzle is stopped, at the same time the paint between the nozzle and the base material and that staying at the exit of nozzle slit are forcedly sucked to inside of the nozzle, therefore even though the volume of paint application is much the starting and ending edges of the coating can be made to form a straight line shape. Moreover, because the paint is guided to the return path to be fed to a place other than the nozzle the pressure in the paint supply means never goes up, therefore the pressure when to resume the paint application is maintained at normal level, and the thicker application at the restart of coating is prevented.

An intermittent coating method according to the present invention comprises a process to apply paint, which is supplied to the nozzle from an intermittent device for supplying paint intermittently, on a continuously running base material and a process to stop the paint application, wherein the process to stop the application suspends flow of said paint to said nozzle, feeds the flow to a place other than the nozzle, at the same time said paint staying in said nozzle and at slit exit is sucked to a specified place provided within said nozzle, whereas the paint application process releases flow of said paint to said nozzle and returns said paint that was sucked in said specific place to inside of said nozzle, and the volume of said paint to be pulled by said sucking is specified to be not less than 0.1 mm$^3$ and not more than 500 mm$^3$ per 10 mm slit width, and said paint is applied intermittently on said base material; therefore by controlling the volume of paint to be forcedly sucked to inside of the nozzle at the stop of application to be not less than 0.1 mm$^3$ per 10 mm slit width, paints staying between the nozzle and the base material and at the slit exit of the nozzle when stopped can surely be sucked to inside of the nozzle. Moreover, by controlling said volume to be not more than 500 mm$^3$, when returning the paint that was sucked to a specified place inside the nozzle to the nozzle in resuming the application, embracing of the air into the paint while the paint is being pushed out in the slit to exit can be avoided. As a result, the starting and ending edges of the coated area are made to have a straight line shape even when the volume of paint application is much.

A manufacturing method of battery electrodes according to the present invention comprises a coating process for applying active material paste which is supplied to the nozzle from an intermittent device on continuously running collector body and a process to suspend the paste application, wherein the process to suspend the paint application stops flow of said active material paste to said nozzle to be led to a place other than said nozzle, and said active material paste staying in said nozzle and at the slit exit are sucked to a specified place provided inside of said nozzle, whereas the paste coating process releases the flow of said active material paste to said nozzle, at the same time returns said active material paste which was sucked into said specific place to inside of said nozzle, and said active material paste is applied intermittently on said collector body; thus the number of manufacturing process steps is reduced realizing an increased productivity because the uncoated areas are already provided on the collector body in the width directon of the collector body, and the adhesion of active material layer to collector body at the boundary area is increased; therefore a battery having improved discharge capacity, rate characteristic, cycle characteristic and other battery characteristics is implemented.

A non aqueous electrolyte battery according to the present invention implements a new battery having improved discharge capacity, rate characteristic, cycle characteristic and other battery characteristics because the battery uses electrodes manufactured in accordance with the above described manufacturing method of battery electrodes.

What is claimed is:

1. An intermittent coating apparatus, comprising:

a roll for making a base material run continuously, a nozzle for applying paint on said base material, said nozzle defining a suction chamber and a slit having an exit, and an intermittent device for supplying paint intermittently to said nozzle, wherein said intermittent device, when the paint application is suspended, stops flow of said paint to said nozzle to be guided to the suction chamber, at the same time sucks said paint staying within said nozzle and at the exit of the slit in to a specified place provided inside said nozzle; and when the paint application is resumed, releases said paint flow to said nozzle, at the same time returns said paint that was sucked in said specified place to inside of said nozzle.

2. The intermittent coating apparatus according to claim 1, wherein the intermittent device further comprises a head slidably mounted to a sliding surface inside the nozzle, said head having an intake and an outlet for paint, wherein said head is provided with a supply channel for feeding said paint flow to inside of said nozzle and a return path for guiding said paint flow to a place other than said nozzle; and, when the paint application is suspended, said head sucks by its position shift said paint to a sucking part provided inside said nozzle, at the same time closes said supply channel with the sliding surface of said nozzle and connects said intake and outlet for paint with said return path; when the paint application is resumed, said head returns by its position shift said paint sucked in said sucking part to original place, and at the same time connects said supply channel with said intake.

3. The intermittent coating apparatus according to claim 1, wherein the specified place is a sucking part formed by the shift of position of a head slidably mounted to a sliding surface inside the nozzle, whereby the volume of paint that can be sucked is identical to the volume of space formed by the shift of position of the head.

4. The intermittent coating apparatus according to claim 1, wherein the volume of paint that can be sucked is identical to the space of sucking part formed by the shift of position of a head slidably mounted to a sliding surface inside the nozzle.

5. The intermittent coating apparatus according to claim 1, wherein the nozzle faces the roll, and wherein the roll has a diameter of at least 50 mm.

6. An intermittent coating apparatus, comprising:

a roll for making a base material run continuously, a nozzle for applying paint on said base material, said nozzle defining a slit having an exit, a downstream lip and an upstream lip relative to a running direction of the base material, and an intermittent device for supplying paint intermittently to said nozzle, wherein said intermittent device, when the paint application is suspended, stops flow of said paint to said nozzle to be guided to a place other than said nozzle, at the same time sucks said paint staying within said nozzle and at the exit of slit in to a specified place provided inside of said nozzle; when the paint application is resumed, releases said paint flow to said nozzle, at the same time returns said paint that was sucked in said specified place to inside of said nozzle; and wherein the downstream lip comprises a surface length of from 0.1 mm to 3 mm.

7. The intermittent coating apparatus according to claim 6, further comprising a head slidably mounted inside the nozzle said head having an intake and an outlet for paint, wherein said head is provided with a supply channel having an entrance for feeding said paint flow to inside of said nozzle and a return path for guiding said paint flow to a place other than said nozzle; and, when the paint application is suspended, said head sucks by its position shift said paint to a sucking part provided inside of said nozzle, at the same time closes the entrance of said supply channel with the sliding surface of said nozzle and connects said intake and outlet for paint with said return path; when the paint application is resumed, said head returns by its position shift said paint sucked in said sucking part to original place, at the same time connects the entrance of said supply channel with said intake.

8. The intermittent coating apparatus according to claim 6, wherein the distance between the upstream lip and downstream lip of the slit is from 0.1 mm to 2 mm.

9. The intermittent coating apparatus according to claim 6, wherein a lip surface of the upstream lip is flat.

10. The intermittent coating apparatus according to claim 6, wherein a lip surface of the downstream lip is flat.

11. The intermittent coating apparatus according to claim 6, wherein a surface length of the downstream lip is: 0.1 mm to 2 mm.

12. The intermittent coating apparatus according to claim 6, wherein the the base material and the nozzle are not more than 2 mm apart.

13. An intermittent coating apparatus comprising a roll for making a base material run continuously, a nozzle for applying paint on said base material, and an intermittent device for supplying paint intermittently to said nozzle, wherein said intermittent device comprises a head slidably mounted to a sliding surface inside of the nozzle, said head having an intake an outlet for paint, and a supply channel for feeding paint flow to inside of said nozzle and a return path for guiding paint flow to a place other than said nozzle, a straight line passing through an entrance and an exit of said return path and the moving direction of said head are in a twisted positioning, and said entrance and said intake for paint are positioned on a same straight line running in parallel with the moving direction of said head, thereby when suspending the paint application work, the position shifting of said head causes sucking of said paint into a sucking part provided in inside of said nozzle, at the same time closes the entrance of said supply channel with the sliding surface of said housing or said nozzle, and connects said intake and outlet for paint with said return path, and when resuming the paint application work, the position shifting of said head causes returning of said paint sucked into said sucking part, at the same time connects the entrance of said supply channel with said intake.

14. The intermittent coating apparatus according to claim 13, wherein the head is capable of shifting 0.1 mm to 50 mm.

* * * * *